United States Patent [19]

Gardiner et al.

[11] Patent Number: 4,780,228

[45] Date of Patent: Oct. 25, 1988

[54] VISCOSITY INDEX IMPROVER—DISPERSANT ADDITIVE USEFUL IN OIL COMPOSITIONS

[75] Inventors: John B. Gardiner, Mountainside, N.J.; Martyn N. Dick, Tervuren, Belgium

[73] Assignee: Exxon Chemical Patents Inc., Linden, N.J.

[21] Appl. No.: 63,539

[22] Filed: Jun. 18, 1987

Related U.S. Application Data

[63] Continuation of Ser. No. 748,031, Jun. 24, 1985, abandoned, which is a continuation-in-part of Ser. No. 628,345, Jul. 6, 1984, abandoned.

[51] Int. Cl.$^4$ ............................................. C10M 145/10
[52] U.S. Cl. ................................ 252/51; 252/5.15 A; 252/56 D; 252/56 R; 525/256; 525/259; 525/261; 525/263; 525/301; 525/382
[58] Field of Search ................ 252/51, 51.5 A, 56 D, 252/56 R; 525/256, 259, 261, 263, 301, 382

[56] References Cited

U.S. PATENT DOCUMENTS

| | | | |
|---|---|---|---|
| Re. 28,341 | 2/1975 | Wadlinger et al. | 208/120 |
| 3,008,895 | 11/1961 | Hansford et al. | 208/68 |
| 3,130,006 | 4/1964 | Rabo et al. | 23/110 |
| 3,132,089 | 5/1964 | Hass et al. | 208/89 |
| 3,132,090 | 5/1964 | Helfrey et al. | 208/89 |
| 3,159,568 | 12/1964 | Price | 208/89 |
| 3,236,761 | 2/1966 | Rabo et al. | 208/111 |
| 3,236,762 | 2/1966 | Rabo et al. | 208/111 |
| 3,267,022 | 8/1966 | Hansford | 208/111 |
| 3,269,934 | 8/1966 | Hansford | 208/111 |
| 3,287,252 | 11/1966 | Young | 208/59 |
| 3,293,192 | 12/1966 | Maher et al. | 252/430 |
| 3,354,077 | 11/1967 | Hansford | 208/111 |
| 3,392,108 | 7/1968 | Mason et al. | 208/111 |
| 3,449,070 | 6/1969 | McDaniel et al. | 23/111 |
| 3,472,758 | 10/1969 | Stine et al. | 208/59 |
| 3,523,887 | 8/1970 | Hanson et al. | 208/111 |
| 3,524,809 | 8/1970 | Hansford | 208/111 |
| 3,549,518 | 12/1970 | Mason | 208/111 |
| 3,553,103 | 1/1971 | Burbidge et al. | 208/111 |
| 3,554,899 | 1/1971 | Hansford | 208/111 |
| 3,617,483 | 11/1971 | Child et al. | 208/59 |
| 3,644,197 | 2/1972 | Kelley et al. | 208/89 |
| 3,644,200 | 2/1972 | Young | 208/120 |
| 3,655,551 | 4/1972 | Hass et al. | 208/59 |
| 3,663,430 | 5/1972 | Morris | 208/111 |
| 3,728,251 | 4/1973 | Kelley et al. | 208/89 |
| 3,781,199 | 12/1973 | Ward | 208/89 |
| 3,836,454 | 9/1974 | Hansford | 208/111 |
| 3,847,792 | 11/1974 | Berger | 208/60 |
| 3,867,277 | 5/1974 | Ward | 208/111 |
| 3,894,930 | 7/1975 | Hensley, Jr. | 208/60 |
| 3,897,327 | 7/1975 | Ward | 208/111 |
| 3,923,640 | 12/1975 | Wight | 208/111 |
| 3,929,672 | 12/1975 | Ward | 252/455 Z |
| 3,937,791 | 2/1976 | Garwood et al. | 423/328 |
| 4,040,944 | 8/1977 | Kelley et al. | 208/89 |
| 4,054,539 | 10/1977 | Henslay, Jr. | 208/111 |
| 4,093,560 | 7/1978 | Kerr et al. | 252/455 |
| 4,097,365 | 6/1978 | Ward | 208/111 |
| 4,134,927 | 1/1979 | Tomoshige et al. | 260/878 R |
| 4,160,072 | 7/1979 | Shimkal et al. | 521/86 |
| 4,160,739 | 7/1979 | Stambaugh et al. | 252/34 |
| 4,257,872 | 3/1981 | LaPierre et al. | 208/59 |
| 4,305,808 | 12/1981 | Bowes et al. | 208/111 |
| 4,326,947 | 4/1982 | Sawyer | 208/111 |
| 4,358,564 | 11/1982 | Ames | 525/261 |
| 4,401,556 | 8/1983 | Bezman et al. | 208/111 |
| 4,419,271 | 12/1983 | Ward | 502/65 |
| 4,431,516 | 2/1984 | Baird et al. | 208/111 |
| 4,431,527 | 2/1984 | Miller et al. | 208/254 |
| 4,456,693 | 6/1984 | Welsh | 502/65 |
| 4,486,296 | 12/1984 | Oleck et al. | 208/111 |
| 4,500,645 | 2/1985 | Fuchikami et al. | 502/65 |
| 4,505,834 | 3/1985 | Papay et al. | 252/51.5 A |
| 4,506,056 | 3/1985 | Gaylord | 524/445 |
| 4,517,073 | 5/1985 | Ward et al. | 208/111 |
| 4,517,074 | 5/1985 | Ward | 208/111 |
| 4,563,434 | 1/1986 | Ward | 502/66 |
| 4,565,621 | 1/1986 | Ward | 208/111 |
| 4,576,711 | 3/1986 | Ward et al. | 208/111 |
| 4,584,287 | 4/1986 | Ward | 502/65 |
| 4,600,498 | 7/1986 | Ward | 208/111 |
| 4,610,973 | 9/1986 | Ward | 502/65 |

FOREIGN PATENT DOCUMENTS

| | | | |
|---|---|---|---|
| 0014291 | 8/1980 | European Pat. Off. | 29/30 |
| 0023802 | 2/1981 | European Pat. Off. | 47/16 |
| 0028938 | 5/1981 | European Pat. Off. | 29/10 |
| 2836076 | 3/1979 | Fed. Rep. of Germany | 33/26 |

*Primary Examiner*—Jacqueline V. Howard
*Attorney, Agent, or Firm*—F. T. Johmann; W. G. Muller; M. B. Kapustij

[57] ABSTRACT

Hydrocarbon polymers such as ethylene copolymers may be reacted with unsaturated nitrogen-containing monomers or unsaturated carboxylic acids in the presence of a free radical catalyst such as a peroxide or azo free radical initiator and a chain stopping agent, e.g. a mercaptan to inhibit excessive cross-linking and branching. The copolymer grafted directly with the nitrogen-containing monomers may be utilized as an additive for oil and fuel compositions, particularly lubricating oil compositions as a V.I.-dispersant additive. The polymer reacted with carboxylic acid may be further reacted with amines, polyols, amino-alcohols, etc. to also form a V.I.-dispersant additive.

52 Claims, No Drawings

VISCOSITY INDEX IMPROVER—DISPERSANT ADDITIVE USEFUL IN OIL COMPOSITIONS

BACKGROUND OF THE INVENTION

This is a continuation of application Ser. No. 748,031, filed 6-24-85, which is now abandoned, which is a continuation-in-part of our prior application Ser. No. 628,345, filed July 6, 1984, now abandoned.

FIELD OF THE INVENTION

The invention relates to polymeric viscosity index (V.I.) improvers—dispersant additives for synthetic and petroleum oils, particularly lubricating oils, These additives comprise a hydrocarbon polymer, for example a copolymer of ethylene with one or more $C_3$ to $C_{28}$ alpha-olefins, preferably propylene, or a hydrogenated copolymer of styrene and butadiene or isoprene, etc. which have been grafted either with nitrogen-containing monomers such as vinyl pyridine, vinyl pyrrolidone, aminomethacrylate, etc. or which have been grafted with an acid moiety, e.g. maleic anhydride, preferably followed by reaction with an amine which will usually be a polyamine. The invention relates to processes for preparing the preceding products and the use of the products of these processes in oil, particularly lubricating and fuel compositions. The processes include the direct reaction of either the nitrogen-containing monomer or the unsaturated acid compound with the hydrocarbon polymer per se, preferably in the solid state; that is, in the absence of solvent or diluent, wherein the grafting is carried out using a free radical generator, e.g. a peroxide or azo initiator, together with a chain stopping agent, e.g. such as a mercaptan or hydroxyl amine in order to hinder cross-linking and occurrence of oil insolubility.

PRIOR DISCLOSURES

Ethylene copolymers, particularly ethylene-propylene copolymers, are in widespread use as viscosity index (V.I.) improving additives for oil compositions, particularly lubricating oil compositions. A substantial body of prior art exists directed towards further reacting these ethylene V.I. improvers to form a multi-functional V.I. improver. This is a material useful as a V.I.-dispersant oil additive so as to improve not only the V.I. properties of the oil but to also impart dispersancy so as to suspend sludge that may form during the operation or use of the lubricant and to inhibit varnish deposition in engines. Various patents teach grafting ethylene copolymers with maleic anhydride, followed by reaction with an amine, either in an oil as a solvent or in a synthetic solvent such as dichlorobenzene, such as the processes disclosed in U.S. Pat. Nos. 4,137,185, 4,144,181 and 4,089,794. Similarly, prior patents, such as U.S. Pat. Nos. 4,092,255, 4,146,489 and 4,170,561, were directed towards grafting the ethylene copolymer directly with a nitrogen compound such as vinyl pyridines and vinyl pyrrolidones, usually in a chemical solvent such as dichlorobenzene or in an oil as a solvent.

The use of solvents for carrying out these reactions involves the expense of subsequently removing the solvent and redissolving the additive in oil to form an oil concentrate, which is the usual way that such additives are marketed. In addition, many of such solvents, such as chlorinated hydrocarbons which do not chain transfer, are expensive and toxic. The idea of carrying out the reaction directly in an oil eliminated the necessity of removing the solvent and gave an economic benefit. However, subsequent problems have arisen using the oil technique since the grafting reaction results in not only the ethylene copolymer being grafted but also various compounds of the oil reacting to form unwanted materials. These unwanted grafted oil materials are not only ineffective as V.I. improvers or as dispersants, but in many cases may cause haze due to the formation of insoluble materials, and are detrimental to engine performance. In addition, the reaction with the oil molecules uses up valuable reactants.

A third approach was to carry out the formation of the desired V.I.-dispersant additive in the absence of any substantial amount of solvent, either oil or synthetic solvent, at least in carrying out the grafting reaction. This approach has been suggested by various prior art patents, such as U.S. Pat. Nos. 4,068,056; 4,068,057 and 4,068,058, wherein amines are directly grafted upon an ethylene-propylene copolymer by mastication or by an extruder, either under a nitrogen atmosphere as in U.S. Pat. No. 4,068,057 or in the presence of oxygen as in U.S. Pat. Nos. 4,068,058 and 4,068,056.

U.S. Pat. No. 3,862,265 has a broad disclosure of extruder-grafting a wide range of polymers including ethylene-propylene elastomers with various monomers, including maleic anhydride. U.K. Pat. No. 857,797 teaches grafting polymers by mastication using peroxide and in the presence of oxygen or air. U.K. Pat. No. 1,119,629 grafts maleic anhydride onto synthetic rubber in an extruder using inhibitors to control cross-linking. U.K. Pat. No. 832,193 has an extensive disclosure wherein various monomers were grafted by mastication upon various polymers using various techniques. The use of chain stopping agents or chain transfer agents have been suggested to inhibit crosslinking, as in U.S. Pat. No. 4,160,072; published Japanese Patent Application No. JA 53-110453 (Publication No. 55-36274) 1980, and in Japanese Patent Publication No. 46-35370 (1971).

The use of non-ethylene hydrocarbon polymers to form V.I.-dispersant additives is also known in the art, such as those of U.S. Pat. Nos. 3,903,003; 4,077,893 and U.S. Pat. No. 4,141,847.

The present invention is a further improvement in forming useful oil soluble additives, wherein the grafting is carried out with the hydrocarbon polymer, preferably a polyolefin in the form of a solid rubber in the substantial absence of any chemical solvent or lubricating oil. This avoids the need to remove the chemical solvent and it avoids the grafting of the oil molecules during the course of the reaction. The present invention preferably utilizes free radical generators, such as peroxides, in order to speed up the graft reaction. However, simply grafting the hydrocarbon polymer, e.g. ethylene copolymer per se either in an extruder or a masticator with peroxide has been found to result in cross-linking the polymer with the frequent formation of insoluble gel, or insoluble gel-like portions, when it was attempted to later dissolve the grafted material in oil. On the other hand, attempting to avoid the gelling by restricting the amount of grafting was unsatisfactory since a certain amount of grafting is necessary to incorporate the desired amount of nitrogen-containing moieties to achieve the desired degree of dispersancy. Thus, the present invention differs from the above-noted prior art in utilizing both a free radical generator and a chain stopping agent in carrying out the grafting of a hydrocarbon polymer in the solid state, i.e. in the substantial absence of solvent or diluent, with an unsaturated monomer which may either be a nitrogen monomer or an unsaturated acid which can then be subsequently reacted with an amine or alcohol, e.g. a polyol, or amino alcohol, in a subsequent reaction to form oil soluble additives.

DESCRIPTION OF PREFERRED EMBODIMENT

Hydrocarbon Polymer

Oil soluble hydrocarbon polymers or copolymers used in the invention generally will have a number average molecular weight ($\overline{M}_n$) of from about 5000 to about 500,000; preferably 10,000 to 200,000 and optimally from about 20,000 to 100,000. In general, polymers useful as V.I. improvers will be used. These V.I. improvers will generally have a narrow range of molecular weight, as determined by the ratio of weight average molecular weight ($\overline{M}_w$) to number average molecular weight ($\overline{M}_n$). Polymers having a ($\overline{M}_w/\overline{M}_n$) of less than 10, preferably less than 7, and more preferably 4 or less are most desirable. As used herein ($\overline{M}_n$) and ($\overline{M}_w$) are measured by the well known techniques of vapor phase osmometry (VPO), membrane osmometry and gel permeation chromotography. In general, polymers having a narrow range of molecular weight may be obtained by a choice of synthesis conditions such as choice of catalyst, or principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

Examples of suitable hydrocarbon polymer include homopolymers and copolymers of two or more monomers of $C_2$ to $C_{28}$, e.g. $C_2$ to $C_{18}$ olefins, including both alpha olefins and internal olefins, which may be straight or branched, aliphatic, aromatic, alkylaromatic, cycloaliphatic, etc. Frequently they will be of ethylene with $C_3$ to $C_{28}$ olefins, particularly preferred being the copolymers of ethylene and propylene, and polymers of other olefins such as propylene, butene and polyisobutylene. Also homopolymers and copolymers of $C_6$ and higher alpha olefins can be preferably employed.

Such hydrocarbon polymers also include olefin polymers such as atactic polypropylene, hydrogenated polymers and copolymers and terpolymers of styrene, e.g. with isoprene and/or butadiene.

The preferred polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

The term copolymer as used herein, unless otherwise indicated, includes terpolymers, tetrapolymers, etc., preferably of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4-allyl cyclohexene and 1-isopropenyl-4-(4-butenyl)cyclohexane.

d. Multi-single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethyl norbornene; 5-methylene-6-methyl-2-norbornene; 5-methylene-6, 6-dimethyl-2-norbornene; 5-propenyl-2-norbornene; 5-(3-cyclopentenyl)-2-norbornene and 5-cyclohexylidene-2-norbornene; norbornadiene; etc.

Other suitable hydrocarbon polymers may be made from styrene, and substituted styrenes, such as alkylated styrene, or halogenated styrene. The alkyl group in the alkylated styrene, which may be a substituent on the aromatic ring or on an alpha carbon atom, may contain from 1 to about 20 carbons, preferably 1-6 carbon atoms. These styrene type monomers may be copolymerized with suitable conjugated diene monomers including butadiene and alkyl-substituted butadiene, etc., having from 1 to about 6 carbons in the alkyl substituent. Thus, in addition to butadiene, isoprene, piperylene and 2,3-dimethylbutadiene are useful as the diene monomer. Two or more different styrene type monomers as well as two or more different conjugated diene monomers may be polymerized to form the interpolymers. Still other useful polymers are derived without styrene and only from aliphatic conjugated dienes, usually having from 4 to 6 carbon atoms most usefully, butadiene. Examples are homopolymers of 1,3-butadiene, isoprene, 1,3-pentadiene, 1,3-dimethylbutadiene, copolymers formed with at least two of these conjugated dienes and copolymers of the latter with styrene, these homopolymers and copolymers having been hydrogenated. These aforesaid polymers with considerable unsaturation are preferably fully hydrogenated to remove substantially all of the olefinic unsaturation, although, in some situations, partial hydrogenation of the aromatic-type unsaturation is effected. These interpolymers are prepared by conventional polymerization techniques involving the formation of interpolymers having a controlled type of steric arrangement of the polymerized monomers, i.e. random, block, tapered, etc. Hydrogenation of the interpolymer is effected using conventional hydrogenation processes.

Polyisobutylenes are readily obtained in a known manner as by following the procedure of U.S. Pat. No. 2,084,501 wherein the isoolefin, e.g. isobutylene, is polymerized in the presence of a suitable Friedel-Crafts catalyst, e.g. boron fluoride, aluminum chloride, etc., at temperatures substantially below 0° C. such as at −40° C. Such isobutylenes can also be polymerized with a higher straight chained alpha-olefin of 6 to 20 carbon atoms as taught in U.S. Pat. No. 2,534,095 where said copolymer contains from about 75 to about 99% by volume of isobutylene and about 1 to about 25% by volume of a higher normal alpha-olefin of 6 to 20 carbon atoms. Copolymers of isobutylene with dienes such as isoprene or piperylene may also be used.

Ethylenically Unsaturated Carboxylic Acid Material

These materials which are grafted onto the hydrocarbon polymer contain 3 to 10 carbon atoms and at least one ethylenic unsaturation and at least one, preferably two, carboxylic acid groups, or an anhydride group, or a polar group which is convertible into said carboxyl groups by oxidation or hydrolysis. Maleic anhydride or a derivative thereof is preferred as it does not appear to homopolymerize appreciably but attaches onto the polymer to give two carboxylic acid functionalities. Such preferred materials have the generic formula

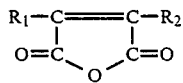

wherein $R_1$ and $R_2$ are hydrogen or a halogen. Suitable examples additionally include chloro-maleic anhydride, itaconic anhydride, hemic anhydride or the corresponding dicarboxylic acids, such as maleic acid or fumaric acid or their monoesters, etc.

As taught by U.S. Pat. No. 4,160,739 and U.S. Pat. No. 4,161,452 various unsaturated comonomers may be grafted on the olefin copolymer together with the unsaturated acid component, e.g. maleic anhydride. Such graft monomer systems may comprise one or a mixture of comonomers different from the unsaturated acid component and which contain only one copolymerizable double bond and are copolymerizable with said unsaturated acid component. Typically, such comonomers do not contain free carboxylic acid groups and are esters containing $\alpha,\beta$-ethylenic unsaturation in the acid or alcohol portion; hydrocarbons, both aliphatic and aromatic, containing $\alpha,\beta$-ethylenic unsaturation, such as the $C_4$-$C_{12}$ alpha olefins, for example isobutylene, hexene, nonene, dodecene, etc.; styrenes, for example styrene, $\alpha$-methyl styrene, p-methyl styrene, p-sec. butyl styrene, etc.; and vinyl monomers, for example vinyl acetate, vinyl chloride, vinyl ketones such as methyl and ethyl vinyl ketone, etc. Comonomers containing functional groups which may cause crosslinking, gelation or other interfering reactions should be avoided, although minor amounts of such comonomers (up to about 10% by weight of the comonomer system) often can be tolerated.

Unsaturated Nitrogen Containing Monomer

Nitrogen containing unsaturated compounds are well known in forming polymers useful as oil additives. These monomers may be used for grafting onto the polymer and include, among others those having 6 to 30 carbon atoms and 1 to 4 nitrogen atoms.

Nitrogen containing acrylate and methacrylate monomers may be used such as dimethylaminoethyl methacrylate or acrylate; acrylamides and methacrylamides such as N-(1,1-dimethyl-3-oxobutyl)acrylamide, N-(1,2-dimethyl-1-ethyl-3-oxobutyl)acrylamide, N-(1,3-diphenyl-1-methyl-3-oxoproyl)acrylamide, N-(1-methyl-1-phenyl-3-oxobutyl)methacrylamide, N,N-diethylaminoethyl acrylamide, 2-hydroxyethyl acrylamide, N-dimethylaminopropyl acrylamide and methacrylamide.

N-vinylcaprolactams may be used. These include N-vinylpyrrolidone, N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, etc.

Vinyl pyridines may be used, such as 2-vinylpyridine, 4-vinylpyridine, and lower alkyl ($C_1$-$C_8$) substituted C-vinylpyridines, such as 2-methyl-5-vinylpyridine, 2-methyl-4-vinylpyridine, 2-vinyl-5-ethyl pyridine, 2-vinyl-6-methylpyridine, etc.

Grafting of the Polymer

The grafting of the polymer with the carboxylic acid material or nitrogen monomer may be carried out in an extruder, a rubber mill, a Banbury mixer, Brabender mixers, and other mechanical mixing devices which can mix or knead the rubber at elevated temperatures with the other components of the reaction into a homogeneous solid rubbery mass so grafting can take place in the solid state. Combinations of equipment may also be used, such as a low temperature mixer for premixing the ingredients, following which they can be transferred to a high temperature heated mixer for grafting.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, di-lauroyl peroxide, 2,5-di-methyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, e.g. 0.05 to 0.5%, based on the total weight of the ethylene copolymer, and temperatures of about 120° to 250° C.

The ethylenically unsaturated nitrogen monomer or carboxylic acid material, preferably maleic anhydride, will be generally used in an amount ranging from about 0.1 to about 10%, preferably 0.5 to 5.0%, based on weight of the initial ethylene copolymer. The aforesaid carboxylic acid or nitrogen monomer material and free radical initiator are generally used in a weight percent ratio range of 1.0:1 to 30:1, preferably 4.0:1 to 12:1.

The chain stopping agent is preferably an aliphatic mercaptan having 4 to 24 carbon atoms, such as t-butyl mercaptan, n-butyl mercaptan, octyl mercaptan, n-dodecyl mercaptan, t-dodecyl mercaptan, etc. The tertiary mercaptans and diethyl hydroxyl amine are particularly effective and are the most preferred. Other chain stopping agents may be used, for example, cumene, alcohols, phenols, etc. The chain stopper will be generally used in an amount of 0.05 to 10 wt. %, e.g. 0.1 to 5 wt. %, based on the weight of the ethylene copolymer.

The initiator grafting is preferably carried out at 120°–250° C., preferably 150°–220° C. An inert atmosphere, such as that obtained by nitrogen blanketing can be used. While the grafting can be carried out in the presence of air, the yield of the desired graft polymer is generally thereby decreased as compared to grafting under an inert atmosphere substantially free of oxygen. The total time will usually range from about 0.005 to 12 hours. If carried out in an extruder, the total time will be relatively short, e.g. 0.005 to 0.2 hours. In a masticator usually from about 0.5 to 6 hours, more preferably 0.5 to 3 hours total time will be required. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the polymer rubber is first heated to about 100°–160° C. and below the grafting temperature to facilitate mixing with the other ingredients, such as the unsaturated graft material, e.g. maleic anhydride, chain stopper and initiator, all of which are added with mixing to form a homogeneous mixture. The chain stopper is preferably added before the initiator. The reaction mixture can then be further heated to grafting temperatures, preferably in the range of about 170° to 240° C. Grafting temperature is the temperature where the initiator breaks down to form free radicals and cause substantial grafting to take place. When the reaction is complete, the excess monomer material may be eliminated by an inert gas purge, e.g. nitrogen sparging. Continuous or periodic addition of the graft material to the reactor can be utilized along with an appropriate portion of initiator and chain stopper during the course of the reaction.

In some cases the grafting can take place in several stages by mixing the reactants together below the grafting temperature; heating to a higher temperature to graft; cooling below grafting temperature; adding and mixing more unsaturated material, initiator and chain stopper; heating again to the grafting temperature to graft the added material, etc. In still other cases, it may be desirable to heat the polymer to grafting temperature and add the chain stopper, the unsaturated acid or nitrogen monomer and the initiator all while at grafting temperatures. Alternatively, the chain stopper can be added to the polymer below grafting temperature, and the initiator and unsaturated acid or nitrogen monomer can be added at grafting temperatures.

After the grafting is complete, diluent oil, such as mineral lubricating oil, may be mixed into the grafted ethylene copolymer to form a concentrate. This dilution can be carried out in a masticator used for the grafting, or dilution can be carried out in a separate heating and mixing vessel. The oil solution can be the final additive product if the grafting used a N-containing monomer. On the other hand, if unsaturated acid or anhydride, such as maleic anhydride was grafted on the polymer, then a further reaction with an amine or hydroxy component is carried out to form a V.I.-dispersant additive. This will usually be carried out using the diluted grafted polymer, in a separate reaction vessel from that used for grafting.

The Amine Component

Useful amine compounds for neutralization of the acid, e.g. maleic anhydride, grafted polymer include mono- and polyamines of about 2 to 60, e.g. 3 to 20, total carbon atoms and about 1 to 12, e.g., 2 to 7 nitrogen atoms in the molecule. These amines may be hydrocarbyl amines or may be hydrocarbyl amines including other groups, e.g., hydroxy groups, alkoxy groups, amide groups, imidazoline groups, and the like. Hydroxy amines with 1 to 6 hydroxy groups, preferably 1 to 3 hydroxy groups are particularly useful. Preferred amines are aliphatic saturated amines, including those of the general formulas:

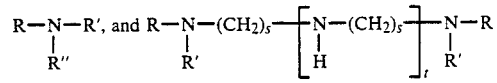

wherein R, R' and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene)triamine; N,N-dimethyl-1,3-diaminopropane; N,N-di-(2-aminoethyl)ethylene diamine; N,N-di(2-hydroxyethyl)-1,3-propylene diamine; 3-dodecyloxypropylamine; N-dodecyl-1,3-propane diamine; tris-hydroxymethylaminomethane (THAM); diisopropanol amine; diethanol amine; triethanol amine; mono-, di-, and tri-tallow amines; N-amino alkyl morpholines where the alkyl is 0 to 5 carbons such as N-(2-aminoethyl)morpholine; N-(3-aminopropyl)morpholine; substituted pyridines such as 2-amino pyridine; 2-methylamino pyridine; and 3-methylamino pyridine; 2-(2-aminoethyl)pyridine; 2-(4-aminoethyl)pyridine; and other amines including 2-amino pyrimidine; 2-amino benzothiazole; 2-aminothiazole; 2-amino-2-thiazoline; methyl-1-phenyl hydrazine; isopropyl ethylene diamine; and para-morpholino aniline; etc.

Other useful amine compounds include: alicyclic diamines such as 1,4-di(aminomethyl)cyclohexane, and heterocyclic nitrogen compounds such as imidazolines, and N-aminoalkyl piperazines of the general formula:

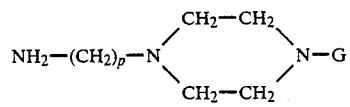

wherein G is independently selected from the group consisting of hydrogen and omega-aminoalkylene radicals of from 1 to 3 carbon atoms, and p is an integer of from 0 to 4, e.g. 1 to 4. Non-limiting examples of such amines include 2-pentadecyl imidazoline; N-(2-aminoethyl)piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine, pentaethylene hexamine, and isomeric piperazines. Low cost poly(ethyleneamines) compounds having a composition approximating tetraethylene pentamine are available commercially under the trade name "Polyamine H" and "Polyamine 400" (PA-400).

Especially preferred are amines having a single primary amine group, with any other amine groups present being tertiary amine groups. This minimizes cross-linking and becomes particularly important when the polymer has a relatively high degree of acidity, e.g. above 0.1 meq./g. of polymer. Mixtures comprising about 70 wt. % or more of amines having only a single primary or secondary group may be used with small amounts of amines having two or more primary or secondary amine groups. Acidities below 0.1 meq./g. polymer are less sensitive to cross-linking and amines with 2 or more reactive groups, i.e. either primary or secondary amine groups, or both primary and secondary amine groups, or a primary amine group and an alcohol group, may be used.

The Alcohol Component

The V.I.-ashless dispersants may be esters derived from the aforesaid polymer grafted with carboxylic acid or anhydride and from hydroxy compounds such as monohydric and polyhydric alcohols or aromatic compounds such as phenols and naphthols etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, etc.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene, amino-arylene or oxy-arylene radicals. They are exemplified by Cellosolve, Carbitol, N,N,N',N'-tetrahydroxy-trimethylene diamine, and the like. For the most part, the ether-alcohols having up to about 150 oxy-alkylene radicals in which the alkylene radical contains from 1 to about 8 carbon atoms are preferred.

Especially preferred are monoalcohols when the acidity is above 0.1 meq./g. of polymer, while polyols may be used at acidities below 0.1 meq./g. of polymer. Preferred V.I.-ester dispersant additives are di-esters of succinic anhydride moieties formed by grafting ethylene copolymer with maleic anhydride.

Reaction of Grafted Polymer with Amine or Alcohol Components

The polymer, grafted with acidic moieties, preferably in solution generally equal to about 5 to 30 wt. %, preferably 10 to 20 wt. % polymer, can be readily reacted with amines or alcohols by heating at a temperature of from about 100° C. to 250° C., preferably from 120° to 230° C., for from about 0.5 to 10 hours, usually about 1 to about 6 hours. The heating is preferably carried out to favor formation of imides, and amides in the case of amine components, or esters in the case of alcohol components. Reaction ratios can vary considerably, depending upon the reactants, amounts of excess, type of bonds formed, etc.

Compositions

A minor amount, e.g. 0.001 up to 50 wt. %, preferably 0.005 to 25 wt. % based on the weight of the total composition, of the oil-soluble graft polymers produced in accordance with this invention can be incorporated into a major amount of an oleaginous material, such as a lubricating oil or hydrocarbon fuel, depending upon whether one is forming finished products or additive concentrates. When used in lubricating oil compositions, e.g., automotive or diesel crankcase lubricating oil, the final grafted polymer V.I.-dispersant concentrations are usually within the range of about 0.01 to 10 wt. %, e.g., 0.1 to 6.0 wt. %, preferably 0.25 to 3.0 wt. %, of the total composition. The lubricating oils to which the products of this invention can be added include not only hydrocarbon oil derived from petroleum, but also include synthetic lubricating oils such as esters of dicarboxylic acids; complex esters made by esterification of monocarboxylic acids, polyglycols, dicarboxylic acids and alcohols; polyolefin oils, etc.

The V.I.-dispersant graft polymers of the invention may be utilized in a concentrate form, e.g., from about 5 wt.% up to about 50 wt. %, preferably 7 to 25 wt. %, in oil, e.g., mineral lubricating oil, for ease of handling.

The above oil compositions may contain other conventional additives, such as dyes, pour point depressants, antiwear agents, antioxidants, other viscosity-index improvers, dispersants, etc.

The following examples, wherein all parts are parts by weight, which include preferred embodiments, further illustrate the present invention.

EXAMPLE 1

1816 g. of ethylene-propylene solid rubber were added through a hatch in the top of a 2.5 gal. laboratory masticator, which was then closed, and heated to 140° C. while mixing under a nitrogen stream for about 45 minutes. This mixing caused the rubber to band, that is form a sticky cohesive mass around the masticator mixer blades. Then, 65 g. of tert. dodecyl mercaptan as chain stopper were added over about 5 minutes, followed by the addition of 62 g. of maleic anhydride over another 5 minutes. Next, 7.3 g. of Lupersol 130 dissolved in 7.3 g. of polyisobutylene of 500 $\overline{M}_n$ mol. wt. for ease of handling were added over another 5 minutes. Mixing under nitrogen at 140° C. continued during all of said additions.

The temperature was then raised over about 15 minutes to 190° C., where the Lupersol rapidly breaks down and the major proportion of the grafting takes place. The masticator contents were then heat soaked at 190° C. for 20 minutes, followed by nitrogen stripping at 1.25 hours at 190° C. to remove unreacted maleic anhydride and other volatiles. Then 4540 g. of S100NLP (Solvent Neutral lubricating oil of 100 SUS viscosity at 37.8° C., low pour) were added over a period of 1.75 hours at 190° C. The temperature was then dropped to 160° C. for 30 minutes, after which the masticator was drained to give the Product of Example 1. All of the preceding was carried out while mixing under a nitrogen atmosphere. The Product of Example 1 was a clear, viscous oil solution of the maleic anhydride grafted rubber. The grafted polymer in this Product analyzed 0.149 milliequivalents of acid per g. of polymer, which indicated that about 43% of the maleic anhydride charged to the masticator had reacted.

The laboratory masticator used above was a Beken Duplex Mixer manufactured by the Bramley Machinery Corp., Edgewater, N.J. It had a 2½ gal. reactor space heated by a Dow Therm containing outer jacket. The mixing blades were mounted on two oppositely rotating shafts. One shaft was rotated at 26 rpm while the other rotated at 52 rpm. Dropping funnels were used to feed the mercaptan, maleic anhydride, and Lupersol 130 solution into the reactor. The reactor was fitted with a nitrogen inlet and an exit vent.

The ethylene-propylene copolymer used above was a V.I. improver for lubricating oil and consisted of about 43 wt. % ethylene and about 57 weight % propylene. It had a Thickening Efficiency (T.E.) of about 2.8 which represents a number average molecular weight of approximately 60,000. It was an amorphous copolymer with a $\overline{M}_w/\overline{M}_n$ of less than 4:1.0.

Thickening Efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($\overline{M}_n$) and is a convenient, useful measurement for formulation of lubricating oils of various grades.

EXAMPLE 2

200 g. of the Product of Example 1, that is the oil solution of maleic anhydride grafted ethylene-propylene copolymer were charged to a 2 liter laboratory resin kettle along with 200 g. of S100NLP mineral lubricating oil. The kettle was equipped with a heating mantle, a dropping funnel, stirrer, overhead water condenser, vacuum pump and a nitrogen inlet for maintaining a nitrogen atmosphere. The temperature was raised to 190° C. while stirring and nitrogen sparging. The temperature was maintained at 190° C. For one hour to remove any moisture or volatiles. Then 1.16 g. of 2-aminomethyl pyridine dissolved in 2.38 g. of S100NLP were added over 10 minutes, followed by continued heating at 190° C. and mixing while under nitrogen for one hour. The reaction mixture was then nitrogen stripped for one hour after which the temperature was lowered to 150° C. and 272 g. of S100NLP were added and mixed for 15 minutes, followed by nitrogen sparging for one hour. The reactor was then drained to give the Product of Example 2 which was an oil solution of the aminated maleic anhydride grafted ethylene-propylene rubber. This Product had a K.V. (Kinematic Viscosity) of 1779 centipoise at 100° C. and was useful as a Viscosity Index improving—sludge dispersant additive, e.g. for lubricating oils.

The Product of Example 2 was tested for storage stability by storing in an oven at 80° C. At the end of two weeks in the oven, the K.V. at 100° C. was 1768 centipoise. After four weeks in the oven, the K.V. at 100° C. was 1745 centipoise, indicating good thermal storage stability.

EXAMPLE 3

200 grams of the Product of Example 1 were added to the 2 liter resin kettle along with 200 grams of S100NLP. The temperature was raised to 190° C. while stirring and nitrogen sparging for a period of one hour. 1.16 grams of 2-aminomethyl pyridine dissolved in 2.38 grams of S100NLP were added over a 10-minute period and reacted for one hour, while continuing the nitrogen sparging. Then the reaction mixture was nitrogen stripped for one hour at 190° C., after which the temperature was lowered to 150° C. and 272 grams of S100NLP were added and mixed for 15 minutes, followed by sparging with nitrogen for another hour. The reaction mixture was then drained to give the product having a K.V. at 100° C. of 1779 centistokes.

EXAMPLE 4

The 2 liter resin kettle was charged with 200 grams of the Product of Example 1 and 200 grams of S100NLP. The temperature was raised to 190° C. while stirring and nitrogen sparging, which conditions were maintained for one hour, after which 0.90 grams of 2-aminopyrimidine were added and reacted for one hour under nitrogen. The reaction mixture was then stripped with nitrogen for one hour at 190° C., after which the temperature was lowered to 150° C. and 272 grams of S100NLP were added and mixed for 15 minutes. The reactor was then drained to give the product having a K.V. at 100° C. of 1774 centistokes.

EXAMPLE 5

The 2 liter resin kettle was charged with 200 grams of the Product of Example 1 and 200 grams of S100NLP. The temperature was raised to 190° C. while nitrogen sparging and stirring for one hour, after which 1.52 grams of 2-amino benzothiazole were added and reacted for one hour. The reaction mixture was then nitrogen stripped for one hour at 190° C., after which the temperature was lowered to 150° C. and 272 grams of S100NLP were added and mixed for 15 minutes, following which the reactor was drained to give the product having a K.V. at 100° C. of 2184 centistokes.

EXAMPLE 6

The 2 liter resin kettle was charged with 200 grams of the Reaction Product of Example 1 and 200 grams of S100NLP. The temperature was raised to 190° C. while stirring under a nitrogen sparge and maintained for one hour. At the end of this time, 1.1 grams of 2-aminothiazole were added and reacted for one hour under the nitrogen. The reaction mixture was then nitrogen stripped for one hour at 190° C. The temperature was lowered to 150° C. and 272 grams of nitrogen sparged S100NLP were added and mixed for 15 minutes, after which the reactor was drained to give the product having a K.V. at 100° C. of 1810 centistokes.

EXAMPLE 7

The 2 liter resin kettle was charged with 200 grams of the Product of Example 1 and 200 grams of S100NLP. The temperature was raised to 190° C. while stirring and nitrogen sparging. Then 1.2 grams of 1-methyl-1-phenylhydrazine dissolved in 2.4 grams of S100NLP were added over a 10-minute period and reacted for one hour while lightly sparging with nitrogen. The reaction mixture was then nitrogen stripped for one hour at 190° C. The temperature was lowered to 150° C. and 272 grams of S100NLP were added and mixed for 15 minutes. The 272 grams of S100NLP had been previously nitrogen sparged for one hour before adding. The reaction mixture was then drained to give the product having a K.V. at 100° C. of 1826 centistokes.

EXAMPLE 8

The 2 liter resin kettle was charged with 500 grams of the Reaction Product of Example 1 and 500 grams of S100NLP. The temperature was raised to 190° C. while stirring and nitrogen sparging and held there for one hour. The temperature was then lowered to 150° C. and 5.5 grams of N-isopropylethylene diamine were added over a 15-minute period, following which the temperature was raised to 190° C. and the amine reacted for a one-hour period. The reaction mixture was then nitrogen stripped for one hour at 190° C., cooled to 150° C. where 680 grams of S100NLP were added and mixed for 15 minutes. Following this, the reactor was drained to give the product having a K.V. at 100° C. of 1438 centistokes.

EXAMPLE 9

The 2 liter resin kettle was charged with 200 grams of the Reaction Product of Example 1 and 200 grams of S100NLP. The temperature was raised to 190° C. and held here for one hour while stirring and nitrogen sparging. Then 1.08 grams of N-aminomorpholine were added slowly and reacted for one hour at 190° C. The reaction mixture was nitrogen stripped for one hour at 190° C., following which the temperature was lowered to 150° C. and 272 grams of S100NLP were added and mixed for 15 minutes. The reactor was then drained to give the final product having a K.V. at 100° C. of 2376 centistokes and a nitrogen content of 0.28 wt. %.

EXAMPLE 10

1816 grams of Nordel 1320 was added to the reactor, that is the 2½ gal. masticator, and heated at 140° C. under nitrogen until banding occurred. Then, 20 grams of octadecyl mercaptan, 14.4 grams of N-vinyl pyrrolidone and 3.6 grams of Lupersol 130 were added to the reactor followed by heating to 170° C. for 45 minutes, while mixing under nitrogen. The reactor was then cooled to 140° C. and 10 grams of octadecyl mercaptan, 14.4 grams of N-vinyl pyrrolidone and 3.6 grams of Lupersol 130 was added to the reactor while mixing and stirring under nitrogen. The masticator, that is the reactor, was heated to 170° C. for 60 minutes under nitrogen while continuing mixing, following which 4540 grams of S100NLP were added and mixed in for about one hour. The masticator was drained to give the final product which was an oil solution of an ethylene copolymer grafted with N-vinyl pyrrolidone, which would be useful as a V.I. dispersant modifying additive in lubricating oil. The final product had a kinetic viscosity at 100° C. of 1080 centipoise and the grafted polymer therein had a T.E. of 1.65.

Nordel 1320 is a terpolymer of about 53 wt. %, ethylene, about 43.5 wt. % propylene and about 3.5 wt. % of 1,4-hexadiene. It has a Mooney viscosity at 212° F. of about 25 and is sold by the DuPont Company.

EXAMPLE 11

1816 grams of the ethylene-propylene rubber used in Example 1 of 2.8 T.E. were added to the 2½ gal. masticator which was then mixed for 45 minutes at 120° C. under nitrogen to form a band. Then 2 grams of Pennstop 2697, which is diethyl hydroxyamine sold as a commercial chain stopping agent, were added over a period of about five minutes. Then 30 grams of N-vinyl pryrrolidone was added over a 5-minute period. This was followed by the addition of 2 grams of Di-CUP-R (dicumyl peroxide), dissolved in 4 grams of polyisobutylene of 500 molecular weight over a 5-minute period. The temperature of the reaction mass was then raised to 160° C. and maintained for a soak period of 30 minutes. 30 grams of N-vinyl pyrrolidone was added at the 160° C. temperature followed by 2 grams of DI-CUP-R dissolved in 4 grams of the 500 molecular weight polyisobutylene, followed by a heat soaking period, while mixing, of 60 minutes at 160° C. After this, the temperature was raised to 175° C. and 10 lbs. of S100NLP were added, followed by nitrogen stripping for 1¼ hours. The reactor was then drained to give the final product having the following characteristics:

K.V. at 100° C. = 1467 centistokes
Nephelometer Haze = 71 (At a reading of about 75 haze will become visible to the naked eye.);
Nitrogen Content of 0.30 wt. % based on the grafted polymer; and a
T.E. for the grafted polymer of 2.60.

EXAMPLE 12

1816 grams of the ethylene-propylene rubber of Example 1 was added to the 2½ gal. masticator reactor and mixed for 45 minutes at 120° C. under nitrogen. Then 2 grams of Pennstop 2697 were added and mixed in. 30 grams of N-vinyl pyrrolidone were added over a 5-minute period followed by the addition of 2 grams of Di-CUP-R dissolved in 4 grams of polyisobutylene of 500 molecular weight (PIB 500) over a period of 5 minutes. The temperature was then raised to 160° C. and maintained for a soak period of 30 minutes. Following this 1 gram of Pennstop 2697 was added over 5 minutes, 30 grams of N-vinyl pyrrolidone was added over 5 minutes, followed by the addition of 2 grams of Di-CUP-R, in 4 grams of PIB 500 in 5 minutes, later followed by 5 minutes of mixing. Then 2 grams of Di-CUP-R in 4 grams of PIB 500 was added, followed by 5 minutes of mixing. Then 2 grams of Pennstop 2697 was added followed by mixing for 5 minutes. Next, 30 grams of N-vinyl pyrrolidone was added followed by mixing for 5 minutes, followed by the addition of 2 grams of Di-CUP-R dissolved in 4 grams of PIB 500 followed by 5 minutes of mixing. The reactor contents were then heat soaked for 30 minutes at 160° C., followed by heating to 175° C. which temperature was maintained for 30 minutes. 10 lbs. of S100NLP were added, followed by nitrogen stripping for 1¼ hours. The reactor was then drained to give a product containing 0.43 wt. % nitrogen, based on the weight of grafted polymer, having a kinetic viscosity at 100° C. of 969 centistokes, and containing a polymer having a T.E. of 1.36. At a 14.3 wt. % concentration of the reaction product in oil, the nephelometer haze heading was +111, indicating that visible haze was present.

COMPARISON EXAMPLES A TO E

A series of examples were carried out in which the chain stopping agent was not used, which shows that the resulting material that formed resulted in the formation of gel and was not completely oil-soluble.

COMPARISON EXAMPLE A

Four pounds of the ethylene-propylene copolymer rubber of Example 1 having a T.E. of about 2.8 were added to the masticator. The copolymer was heated and mixed in the presence of air until its T.E. had been reduced to 2.1. The masticator was then flushed with nitrogen and 35 grams of maleic anhydride was added, while the temperature was raised to 175° C. as the material was worked in the masticator. 5 grams of Lupersol 130 were dissolved in a sufficient amount of S100NLP to make 50 milliliters (10% active ingredient) of the oil solution of the initiator. 20 milliliters of this solution were added while mixing at 175° C. under nitrogen. 30 minutes later another 10 milliliters of the solution were added. Ten minutes later another 10 milliliters of the peroxide solution were added. Ten minutes later still another 10 mil. of peroxide solution were added. This stage addition, i.e. periodic addition was done in order to obtain good dispersancy of the peroxide in the solid ethylene-propylene copolymer. The masticator contents were soaked, that is mixed, under the nitrogen blanket for another 60 minutes, after which 4540 g. of Solvent 100NLP were added and mixed, followed by draining the reactor to give the product.

COMPARISON EXAMPLES B TO E

These were carried out in the same manner noted above except for the changes noted in the following Table I.

Comparison Examples A to E are summarized in the following Table I.

a dropping funnel over a 15 minute period, followed by the addition of 2.1 lbs. of melted maleic anhydride, added through said dropping funnel. Initially, 100 ml. of the maleic anhydride was added. Then the remaining maleic anhydride was added over a 15 minute period simultaneously while adding 0.9 lbs. of 1.2 lbs. of an initiator solution that had been made up consisting of 0.2 lbs. of ditertiary butyl peroxide dissolved in a mixture consisting of 0.7 lbs. of PIB 500 and 0.3 of a lb. of ISOPAR M which is a hydrocarbon solvent. After this 15 minute period, then the remaining 0.3 lbs. of said initiator solution were added over a five minute period. This last addition was followed by soaking and mixing for 50 minutes, followed by nitrogen stripping. Then 425 lbs. of S100NLP oil, which have been previously sparged with nitrogen to remove moisture and volatiles, were added to the masticator in a series of small increments, each increment being mixed into the reaction mass before the next increment. The first increment was 20 lbs. followed by increments of 25 lbs., 30 lbs., 40 lbs., 50 lbs., 50 lbs., 50 lbs., 50 lbs. and then the balance. The temperature was lowered to 200° F. while mixing continued. Then the masticator was drained to give the oil solution of the ethylene copolymer rubber grafted with maleic anhydride. The concentrate titrated to 0.192 meq. acid/g. of the grafted polymer.

Part B

A reactor was charged with 100 lbs. of S150NLP mineral lubricating oil which was heated to 100° C. and nitrogen stripped. Following this, 100 lbs. of the oil solution of the ethylene copolymer grafted with maleic anhydride prepared in Part A were added to the reactor

TABLE I

|  | Comparative Examples | | | | |
| --- | --- | --- | --- | --- | --- |
|  | A | B | C | D | E |
| Ethylene-Propylene Copolymer, g. | 1816 g. | 1816 g. | 1816 g. | 1816 g. | 18 |
| Maleic Anhydride, g. | 35 g. | 45 g. | 45 g. | 45 g. | 45 g. |
| Peroxide Addition, ml. solution | 50 (10% a.i.) | 90(10% a.i.) | 70 (12% a.i.) | 50 (2.5% a.i.) | None |
| 1st. addition, ml./Temp. °C. | 20/175° C. | 30/175° C. | 20/150° C. | 20/140° C. |  |
| Time interval, min. | 30 min. | 30 min. | 30 min. | 30 min. |  |
| 2nd. addition, ml./Temp. °C. | 10/175° C. | 20/175° C. | 10/150° C. | 10/170° C. |  |
| Time interval, min. | 10 min. | 10 min. | 30 min. | 30 min. |  |
| 3rd. Addition, ml./Temp. °C. | 10/175° C. | 20/175° C. | 10/150° C. | 10/170° C. |  |
| Time interval, min. | 10 min. | 10 min. | 30 min. | 30 min. |  |
| 4th. Addition, ml./Temp. °C. | 10/175° C. | 20/175° C. | 10/150° C. | 10/170° C. |  |
| Time interval, min. | — | — | 30 min. | 30 min. |  |
| 5th. Addition, ml./Temp. °C. | — | — | 10/150° C. | — |  |
| Time interval, min. | — | — | 30 min. | — |  |
| 6th. Addition, ml./Temp. °C. | — | — | 10/150° C. | — |  |
| Soak Temp./Time, °C./min. | 175° C./60 min. | 175° C./60 min. | 150° C./60 min. | 170° C./60 min. | 150° C./120 min. 170° C./60 min. |
| Addition of oil, g. | 4540 | 4540 | 4540 | 4540 | none |
| Product | Gelled | Gelled | Gelled | Gelled | No significant amount of maleic anhydride grafted. |

Examples A to D of Table I show that even adding the peroxide in small increments, without the chain stopper did not prevent gelling. Example D used only 1.25 g. of actual peroxide and still gelling occurred. Example E shows that without the peroxide no substantial amount of grafting occurred.

EXAMPLE 13

Part A 100 lbs. of the solid ethylene-propylene copolymer rubber used in Example 1 was added to a 50 gal. rubber masticator in the form of five 20 lb. pieces. The copolymer was masticated and nitrogen stripped in the Dow-Therm heated masticator until the temperature reached 210° F. 1 lb. of t. dodecyl mercaptan was added through followed by mixing, nitrogen stripping and heating until the temperature reached 190° C. Then, 0.35 lbs. of N-aminopropyl morpholine (NAPM) dissolved in 1 lb. of said oil was added over a 20-minute period to the reactor through an inlet line which was then followed with ½ lb. of said oil to flush the line. Mixing and heating continued for one hour under nitrogen after which 19 lbs. of said oil were added, followed by vacuum stripping for one hour and then draining to give the final product, which was useful as a multi-functional V.I.-dispersant additive concentrate. This product analyzed 0.27 wt. % nitrogen based on the weight of the polymer, i.e. the aminated grafted polymer. The aminated grafted polymer had a T.E. of 2.46. The haze level of the concentrate was at a nephelometer reading of 102.

EXAMPLE 14

A lubricating oil composition was prepared by mixing 13 wt. %, based on the weight of the total composition, of the final product of Part B of Example 13; that is, the oil concentrate of the V.I. dispersant additive, about 1.4 wt. % of a nonylphenol sulfide additive as an antioxidant, 1.3 wt. % of an overbased 400 Total Base No. magnesium sulfonate additive, 1.8 wt. % of a zinc dialkyldithiophosphate additive (about 75 wt. % active ingredient), 0.25 wt. % of a pour depressant additive, and about 82.25 wt. % of a mineral lubricating oil, to form a 10W40 crankcase oil having a viscosity of about 14.5 centistokes at 100° C. This oil was tested in the MS-VD test and passed, having a sludge rating of 9.63; a varnish rating of 7.04; a piston skirt varnish rating of 6.77; a cam and lifter wear average of 0.0050 inch and a maximum cam wear of 0.008 inch.

EXAMPLE 15

A 10W40 lubricating oil composition was prepared showing the material of the invention supplemented by other dispersants, by mixing about 12 wt. %, based on the total composition, of the final product of Part B of Example 13, 1.1 wt. % of antioxidant, 2.2% of an overbased metal sulfonate, 1.45 wt. % of a zinc dithiophosphate additive, and other dispersant/detergents along with antifoam, antifriction, and pour depressant additives, with 74.5 wt. % of lubricating oil.

What is claimed is:

1. A process comprising grafting in the substantial absence of solvent a hydrocarbon polymer of $C_2$ to $C_{28}$ olefin, said polymer having a number average molecular weight in the range of about 5,000 to 500,000 with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in the presence of a free radical initiator and a chain stopping agent comprising at least one member selected from the group consisting of aliphatic mercaptans having 4 to 24 carbon atoms, diethyl hydroxyl amine, cumene and phenols, said grafting being conducted in a manner and under conditions sufficient to form a substantially oil soluble graft copolymer useful as a viscosity index improver-dispersant additive for lubricating oil compositions.

2. A process according to claim 1, wherein said hydrocarbon polymer is a hydrogenated copolymer of styrene with at least one aliphatic diene selected from the group consisting of butadiene and isoprene.

3. A process according to claim 2, wherein said hydrocarbon polymer is a hydrogenated polymer of blocks of styrene with blocks of said diene.

4. A process according to claim 1, wherein said hydrocarbon polymer is a copolymer of ethylene with a $C_3$ to $C_{28}$ alpha olefin.

5. A process according to claim 4, wherein said hydrocarbon polymer consists essentially of ethylene and propylene.

6. A process comprising grafting in the substantial absence of solvent an oil-soluble ethylene copolymer comprising about 15 to 90 weight % ethylene and about 10 to 85 weight % of $C_3$ to $C_{28}$ alpha-olefin, said copolymer having a number average molecular weight within the range of about 5,000 to 500,000 with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in the presence of a free radical initiator and a chain stopping agent comprising at least one member selected from the group consisting of aliphatic mercaptans having 4 to 24 carbon atoms, diethyl hydroxyl amine, cumene and phenols, said grafting being conducted in a manner and under conditions sufficient to form a substantially oil soluble graft copolymer useful as a viscosity index improver-dispersant additive for lubricating oil compositions.

7. A process according to claim 6, wherein said copolymer is grafted with said unsaturated material by mixing said copolymer, unsaturated material, free radical initiator and chain stopper at about 120° to 250° C. for about 0.005 to 12 hours.

8. A process according to claim 6, wherein the grafted material is subsequently mixed with mineral lubricating oil to form an oil concentrate or an oil composition.

9. A process according to claim 6, wherein said mixture comprises about 0.1 to 10 wt. % of said unsaturated material, about 0.05 to 10 wt. % of said chain stopping material and about 0.005 to 1 wt % of said free radical initiator, all of said weight percents being based upon the weight of said copolymer.

10. A process according to claim 6, wherein a homogeneous mixture is formed of said ethylene copolymer, unsaturated material, initiator and chain stopping agent by heating and mixing at a first temperature below the temperature at which said initiator generates substantial free radicals, and then heating and mixing at a second higher temperature at which said initiator generates substantial free radicals and a major proportion of said grafting takes place.

11. A process according to claim 10, wherein said first temperature is in the range of about 100° to 160° C. and said second temperature is in the range of about 170° to 240° C.

12. A process according to claim 10, wherein said process is carried out in multiple stages, said first stage comprising forming said homogeneous mixture at said first temperature, then heating and mixing at said second temperature to effect grafting; and at least one additional stage of cooling to said first temperature, adding additional unsaturated material, initiator, and chain stopping agent at said first temperature and reheating and mixing to said second temperature to effect grafting of said additional unsaturated material.

13. A process according to claim 6, wherein said ethylene copolymer is a normally solid rubber at room temperature and mixing is carried out in a mechanical mixer which heats and kneads said rubber, unsaturated material, initiator and chain stopping agent into a homogeneous solid rubbery mass in which grafting takes place in the solid state.

14. A process according to claim 6, wherein said unsaturated material is said unsaturated carboxylic acid or anhydride.

15. A process according to claim 14, wherein said unsaturated material is maleic anhydride.

16. A process according to claim 14, wherein said graft material is dissolved in a mineral lubricating oil and reacted with an amine having 2 to 60 carbon atoms and 1 to 12 amine groups to form an oil soluble Viscosity-Index improving—dispersant additive concentrate.

17. A process according to claim 16, wherein said carboxylic acid material is maleic anhydride and said amine is a polyamine having at least one primary amine group.

18. A process according to claim 6, wherein said copolymer consists essentially of about 30 to 80 weight % ethylene and about 20 to 70 weight % propylene, and has a number average molecular weight in the range of about 10,000 to 200,000.

19. A process according to claim 6, wherein said free radical initiator is a peroxide.

20. A process according to claim 19, wherein said chain stopping agent is a $C_4$ to $C_{24}$ aliphatic mercaptan.

21. A process according to claim 6, wherein said unsaturated material is said nitrogen-containing ethylenically unsaturated monomer.

22. A process according to claim 21, wherein said nitrogen containing monomer is selected from the group consisting of vinyl pyridenes, vinyl pyrrolidones, acrylates and methacrylates.

23. A process according to claim 6, wherein said ethylene copolymer consists of ethylene and propylene.

24. A process according to claim 6, wherein said ethylene copolymer is a terpolymer of ethylene, propylene and an unsaturated diene.

25. The product produced by a process according to claim 1.

26. The product produced by a process according to claim 2.

27. The product produced by the process according to claim 4.

28. The product produced by the process according to claim 6.

29. The product produced by the process according to claim 8.

30. The product produced by the process according to claim 16.

31. The product produced by the process according to claim 21.

32. A lubricating oil composition comprising a lubricating oil and the product of claim 25.

33. A lubricating oil composition comprising a lubricating oil and the product of claim 26.

34. A lubricating oil composition comprising a lubricating oil and the product of claim 27.

35. A lubricating oil composition comprising a lubricating oil and the product of claim 28.

36. A lubricating oil composition comprising a lubricating oil and the product of claim 29.

37. A lubricating oil composition comprising a lubricating oil and the product of claim 30.

38. A lubricating oil composition comprising a lubricating oil and the product of claim 31.

39. A process comprising grafting in the substantial absence of solvent at a temperature from about 120° to 250° C. for about 0.005 to 12 hours, a hydrocarbon polymer of $C_2$ to $C_{28}$ olefin, said polymer having a number average molecular weight in the range of about 5,000 to 500,000 with from about 0.1 to 10 weight % of an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in the presence of about 0.005 to 1.0 weight % of a free radical initiator and about 0.05 to 10 weight % of a chain stopping agent consisting of one or more of an aliphatic mercaptan having 4 to 24 carbon atoms, diethyl hydroxyl amine, cumene or phenols, all of said weight percentages being based upon the weight of said copolymer.

40. A process according to claim 39, wherein said hydrocarbon polymer is an oil-soluble ethylene copolymer comprising about 15 to 90 weight % ethylene, about 10 to 85 weight % of one or more $C_3$ to $C_{28}$ alpha-olefins, and from 0 to about 20 weight % of one or more non-conjugated diolefins.

41. A process according to claim 40, wherein said hydrocarbon polymer is a hydrogenated copolymer of styrene with at least one aliphatic diene selected from the group consisting of butadiene and isoprene.

42. A process according to claim 40, wherein said hydrocarbon polymer is a copolymer of ethylene with $C_3$ to $C_{28}$ alpha olefin.

43. A process according to claim 40, wherein said copolymer is grafted with said unsaturated material by mixing said copolymer, unsaturated material, free radical initiator and chain stopper at about 120° to 250° C. for about 0.005 to 12 hours.

44. A process according to claim 40, wherein a homogeneous mixture is formed of said ethylene copolymer, unsaturated material, initiator and chain stopping agent by heating and mixing at a first temperature below the temperature at which said initiator generates substantial free radicals, and then heating and mixing at a second higher temperature at which said initiator generates substantial free radicals and a major proportion of said grafting takes place.

45. A process according to claim 40, wherein said ethylene copolymer is a normally solid rubber at room temperature and mixing is carried out in a mechanical mixer which heats and kneads said rubber, unsaturated material, initiator and chain stopping agent into a homogeneous solid rubbery mass in which grafting takes place in the solid state.

46. A process according to claim 40, wherein said unsaturated material is said unsaturated carboxylic acid or anhydride.

47. A process according to claim 40, wherein said copolymer consists essentially of about 30 to 80 weight % ethylene and about 20 to 70 weight % propylene, and has a number average molecular weight in the range of about 10,000 to 200,000.

48. A process according to claim 40, wherein said free radical initiator is a peroxide.

49. A process according to claim 40, wherein said unsaturated material is said nitrogen-containing ethylenically unsaturated monomer.

50. A process according to claim 40, wherein said ethylene copolymer consists of ethylene and propylene.

51. A process according to claim 40, wherein said ethylene copolymer is a terpolymer of ethylene, propylene and an unsaturated diene.

52. A process according to claim 40, wherein the grafted material is subsequently mixed with mineral lubricating oil to form an oil concentrate.

* * * * *